United States Patent [19]
Altinger

[11] Patent Number: 5,119,515
[45] Date of Patent: Jun. 9, 1992

[54] ARTICLE OF PROTECTIVE CLOTHING, IN PARTICULAR PROTECTIVE SUIT, PROVIDING PROTECTION AGAINST HEAT AND CHEMICALS

[76] Inventor: Winfried Altinger, Holderlinstrasse 39, 7530 Pforzheim-8, Fed. Rep. of Germany

[21] Appl. No.: 613,048

[22] Filed: Nov. 15, 1990

[30] Foreign Application Priority Data

Nov. 15, 1989 [DE] Fed. Rep. of Germany ... 8913473[U]

[51] Int. Cl.⁵ .................................... A41D 13/00
[52] U.S. Cl. .................................... 2/243 A; 2/2;
2/51; 2/81; 2/69; 428/252; 428/102; 428/104;
428/902; 428/920; 428/295
[58] Field of Search ............... 2/243 A, 2, 51, 69,
2/81; 428/252, 102, 104, 902, 920, 295

[56] References Cited

U.S. PATENT DOCUMENTS

| | | | |
|---|---|---|---|
| 3,563,198 | 2/1971 | Johnston | 2/81 |
| 4,223,064 | 9/1980 | Ballif, III et al. | 2/2 |
| 4,255,817 | 3/1981 | Heim | 2/51 |
| 4,502,153 | 3/1985 | Lapedes et al. | 2/81 |
| 4,583,247 | 4/1986 | Fingerhut et al. | 2/81 |
| 4,849,280 | 7/1989 | Coombs | 428/233 |

FOREIGN PATENT DOCUMENTS

| | | | |
|---|---|---|---|
| 385470 | 4/1988 | Austria | 423/233 |
| 3437383 | 4/1985 | Fed. Rep. of Germany | 428/233 |
| 3737299 | 5/1988 | Fed. Rep. of Germany | 428/233 |
| 3829501 | 3/1989 | Fed. Rep. of Germany | 428/233 |

OTHER PUBLICATIONS

Hofmann; W.: Eigenschaften und Anwendung ausgewahlter Elstomerklassen. In: Kunststoffe 78, 1988, H.2, S.132–141.

Rothiuzen; W. J.: Chemiefasern mit speziellen Eigenschaften—unter besonderer Berucksichtigung der aromatischen Polyamide. In: GAK Jun./1977, Jf. 30, S.364–372.

Primary Examiner—Werner H. Schroeder
Assistant Examiner—Gloria Hale
Attorney, Agent, or Firm—Spensley Horn Jubas & Lubitz

[57] ABSTRACT

An article of protective clothing composed of a multi-layered material formed of the following sequence of layers from the outside to the inside:
a first layer of a fluorine elastomer;
a second layer of butyl rubber;
a third layer of an aramid fiber cloth; and
a fourth layer of butyl rubber.

14 Claims, 1 Drawing Sheet

ARTICLE OF PROTECTIVE CLOTHING, IN PARTICULAR PROTECTIVE SUIT, PROVIDING PROTECTION AGAINST HEAT AND CHEMICALS

BACKGROUND OF THE INVENTION

The present invention relates to an article of protective clothing, in particular a heatproof protective suit which provides protection against chemicals and which is made of a multi-layered material.

Suits providing protection against chemicals are generally used to allow the performance of work in connection with, for example, maintenance and repair jobs by personnel in the chemical industry and also in the course of accidents, in particular by firefighters, and to provide, at the same time, those performing this work with protection which is as complete as possible against environmental dangers arising therefrom. The effects of liquid or gaseous chemicals, in particular, are addressed in that such chemical protective suits are intended to be resistant thereto to the greatest degree. For example, a layer of butyl rubber is used for the gas-tight insulation of the protective clothing (FRG patent DE-A-38 29 501).

Although such chemical protective suits must be basically distinguished by their construction from heat protective suits, for example for firefighting, the above description of their areas of employment readily makes it clear that the need to protect a wearer of such protective suit against chemicals can not be neglected because of the possibility of unexpected or unforeseeable developments, particularly chemical reactions resulting in a sudden development of great heat, for example combustion or explosions. Even if the affected personnel leaves the respective place as quickly as possible, such unforeseeable heat and/or flame generation means considerable endangerment of the people involved, because the known material structures do not offer protection against this.

On the other hand, the above mentioned work in the chemical field requires a certain amount of mobility and flexibility of the personnel, so that the creation of a protective suit by, for example, the "addition" of chemically resistant materials on the one hand and fire protection material on the other has been found unacceptable because of the great weight created by this, along with a reduction of the freedom of action of the personnel involved.

A laminated material for protective clothing is known from FRG patent DE-A-38 29 501, which is intended to protect against both dangers, namely the effect of chemicals on the one hand and of heat on the other. As in most known multi-layered chemical protective clothing there are also layers of thermoplastic material provided here, particularly of polyester or polyethylene, which are not heat resistant over long periods of time and which themselves can burn or melt. In this case such a protective suit would be destroyed and the chemical protection would also be lost. Therefore the protective clothing with a laminated material in accordance with D-A-38 29 501 is at best suitable for the short-term effect of heat or flames; the outer layer of reflecting metal foil intended for this cannot keep the effects of extended heat away from the heat-sensitive inner polyethylene layers. Additional, the production costs for this laminated material are very high and protective clothing made from it was never put on the market.

SUMMARY OF THE INVENTION

In contrast to such known protective clothing as disclosed in DE-A-38 29 501, the object of prime importance of the present invention is therefore to improve an article of protective clothing, in particular a chemical protective suit of multi-layered construction, in such a way that the protection against chemicals is at least maintained, but that additionally improved protection against the effects of heat or fire is provided.

In accordance with the invention, this object is attained by provision of an article of protective clothing composed of a multi-layered material formed of the following sequence of layers from the outside to the inside:

a first layer of a fluorine elastomer;
a second layer of butyl rubber;
a third layer of an aramid fiber cloth; and
a fourth layer of butyl rubber.

Aramid cloth of the type used here is commercially available under the name "KEVLAR" (a trademark of DuPont) or "TWARON" (a trademark of ENKA AG, Wuppertal, Germany).

Such textiles are already known for use in the outer layer of special fire protective clothing (U.S. Pat. No. 4,849,280; FRG DE-A-34 37 383; DE-A-37 37 299).

It is particularly advantageous if the aramid cloth is in the form of a double-layered, flexible cloth with a weight per unit area of approximately 110 g/m$^2$. This very low weight per unit area of the third layer provides the opportunity of making the other layers, the purpose of which is the provision of sufficient chemical resistance, stronger and in this way to increase the protective effect with respect to chemicals.

DETAILED DESCRIPTION OF A PREFERRED EMBODIMENT

Figure 1:
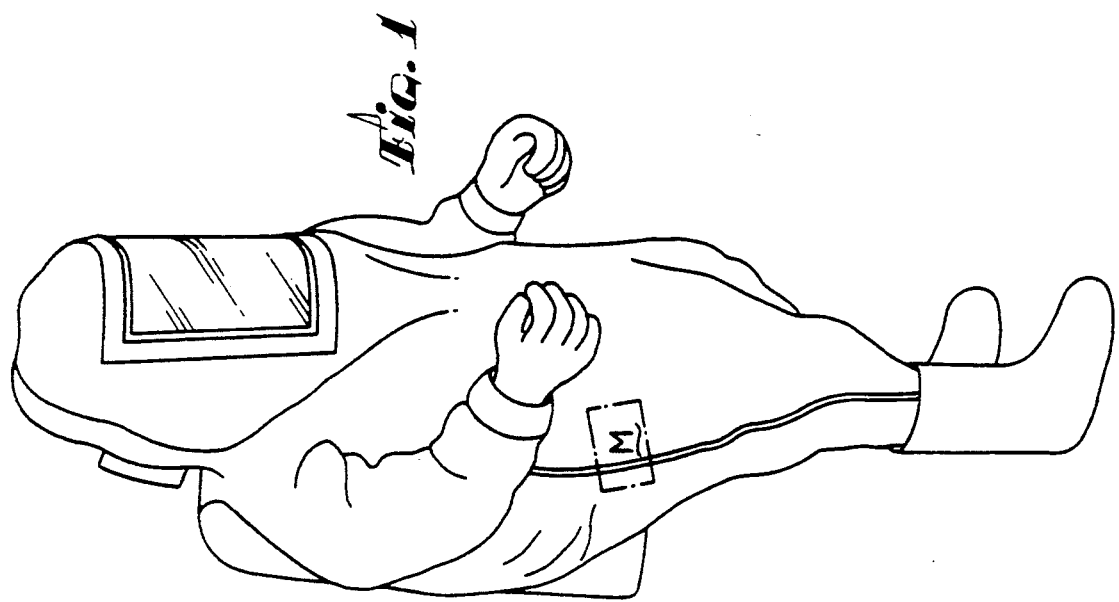
FIG. 1 is a pictorial view of a protective suit which may be made with the layered construction in accordance with the invention.

FIG. 1 illustrates a protective suit having the outward appearance of conventional protective suits but made of a material M according to the present invention. The multi-layered material M can be particularly used for the manufacture of chemical protective suits, but naturally also for other articles of protective clothing, such as gloves, face masks, coats, trousers, etc.

Figure 2:
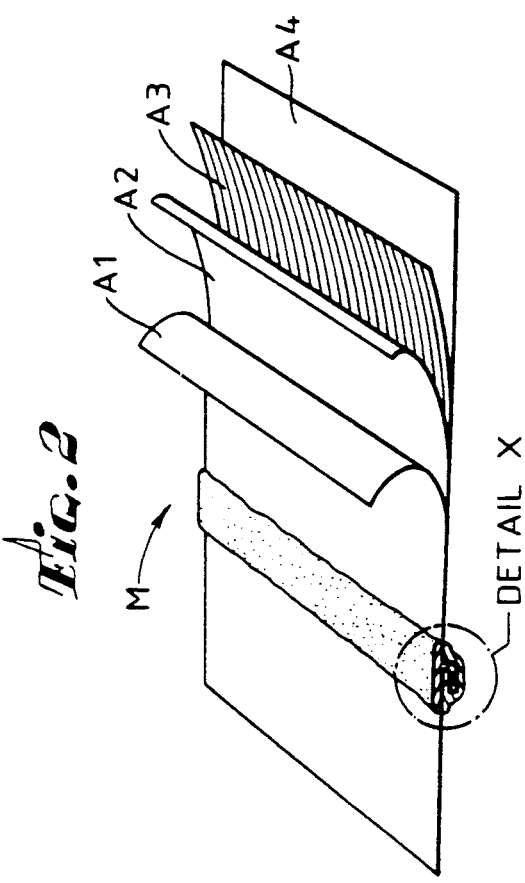
FIG. 2 is a perspective detail view illustrating the layered structure of the suit of FIG. 1 made according to the present invention.

In accordance with a preferred embodiment of material M, shown in FIG. 2, individual layers A1 ... A4 are constructed as follows and have the following purposes:

The outer layer A1 consists of a fluoroelastomer such as is commercially available under the trademark VITON of DuPont, having a weight per unit area of approximately 150 g/m$^2$. This layer serves as the first protective layer against chemicals, i.e. as the outermost barrier against chemicals of various types, in particular against those to which the successive inner layer A2 is sensitive, or vulnerable, for example toluene.

The second layer A2 from the outside consists of a butyl rubber, also having a weight per unit area of approximately 150 g/m². Butyl rubbers are copolymers of isobutylene with small amounts of isoprene; in this connection the fact that they can be vulcanized is of special importance. Butyl rubbers have excellent resistance against water and a large number of chemicals as well as an extremely low gas permeability. In the structure in accordance with the invention they act as a second protective layer against chemicals, i.e. for blocking all those chemicals or stopping all those gases which could penetrate the first protective layer A1.

The third layer A3 is a double-layered cloth of aramid fiber with a weight per unit area of approximately 110 g/m², which is commercially available under the trademark TWARON from the firm ENKA AG, Wuppertal. Aramids are fibers of long-chain aromatic polyamides having very high mechanical stability and high temperature resistance and which, particularly in contrast to the thermoplastic materials used in protective suits against chemicals up to now, do not melt.

A further protective layer against chemicals of butyl rubber is used as the fourth and innermost layer A4.

The layered structure offers optimum protection against the effects of chemicals and gases, but also relatively long-lasting protection against heat and flame, particularly in connection with uncontrollable processes when dealing with highly flammable chemicals, gases and dust.

A particular advantage of the layered structure in accordance with the invention is seen in that the protective suit remains pliable and does not become brittle even at very low temperatures.

The second and fourth layers A2 and A4, of butyl rubber, are used simultaneously as protection on both sides of the enclosed aramid fiber cloth forming third layer A3.

All of the layers can be connected with each other by vulcanizing, so that thermoplastic intermediate layers, required in the known articles of protective clothing and which were also intended to provide a firm connection between the individual layers, are no longer needed.

Figure 3:
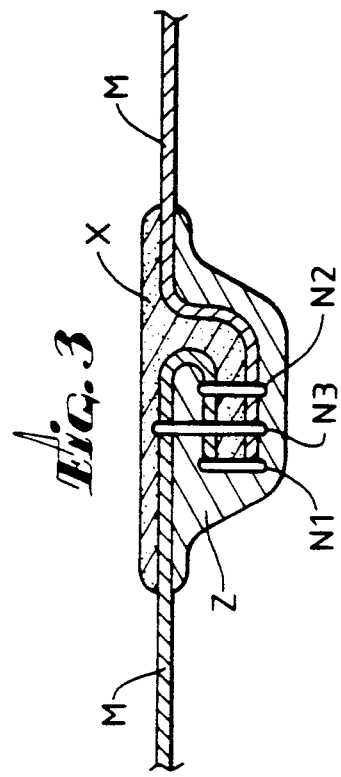
FIG. 3 is a cross-sectional detail view of a seam in a protective s it according to the invention.

A characteristic feature of a protective suit constructed from this material is seen in the design of the seams, such as shown in FIG. 3 which illustrates the part of the fabric of FIG. 2 which is enclosed by a circle and labelled "Detail X".

As shown in FIG. 3, which is not to scale and is only intended as illustration, adjacent border areas of two panels of the multi-layered material M are folded at the seam. The upper, outwardly oriented adjacent border areas of the panels of material M are covered by a sealing layer X of fluoroelastomer, corresponding in composition to the outer layer A1 of the material M itself, e.g. of VITON, e.g. by application with a brush of the material in liquid form, so that all exposed surfaces of the material M are connected by means of an intermediate and cover layer of the same material in the areas of overlap and of the edges. A homogenous structure is achieved in this manner.

Correspondingly, to further achieve a homogenous structure, the inner surface of the material M, i.e. the inner layer A4 oriented towards the body, is covered at the panel border areas by a sealing layer Z of butyl rubber, i.e. preferably of the same composition as layer A4. Layer Z may be applied in the same manner as layer X.

The required mechanical stability is achieved by the seams N which have been applied as shown. In this connection it is important that aramid fibers of TWARON are also used for the seam thread so that, because of the heat resistance of this material, ripping open or breaking open of the seam is impossible, even during considerable thermal stress of the protective suit against chemicals.

The seam connection has the following structure:

It comprises a total of three seams N1, N2, N3. First an overhand seam N1 with simultaneous cutting of the panel edges is made on a special machine, then a second seam N2 (closing seam) is made slightly back of the first, with respect to the panel edges, and finally an edge portion of the joined panels is folded over (to the left in FIG. 3) and is again continuously sewn to form the third seam N3 (turned-in seam) which involves sewing through a second thickness of the left-hand panel. Subsequently the layers X and Z are applied as a seal.

Protective suits having the layered structure in accordance with the invention have been repeatedly tested and the following values have been attained with the use of the above described exemplary embodiment:

The protective suits VS 10 SYKAN ® 3 and VS 10 WIPAN have been tested against the following test chemicals and are resistant according to VIDB-guideline 0801:

| | | | SYKAN ® 3 |
|---|---|---|---|
| 10 reference test chemicals according to VIDB-guideline 0801: | | | |
| 1,2-dichlorethane | 20 ml/m³ | L | 30 min |
| ammonia | 50 ml/m³ | G | 60 min |
| toluene | 200 ml/m³ | L | 60 min |
| triethylamine | 10 ml/m³ | L | 60 min |
| chlorine | 1 ml/m³ | G | 60 min |
| methanol | 200 ml/m³ | L | 60 min |
| nitric acid 65% | | L | 60 min |
| hydrogen chloride | 5 ml/m³ | G | 60 min |
| n-octane | 500 ml/m³ | L | 60 min |
| sulphuric acid 96% | | L | 60 min |
| Further chemicals or substances tested according to VIDB guidelines: | | | |
| acetaldehyde | | | 90 min |
| acrylonitrile | | | 60 min |
| formic acid | | | 90 min |
| aniline | | | 60 min |
| hydrogen cyanide | | | 60 min |
| chlorobenzene | | | 60 min |
| 3,4-dichlorbutene | | | 60 min |
| dichloromethane | | | 60 min |
| dimethyl formamide | | | 60 min |
| epichlorohydrine | | | 60 min |
| acetic acid 96% | | | 60 min |
| ethyl acetate | | | 60 min |
| cresol | | | 60 min |
| methyl acetate | | | 60 min |
| methylene chloride | | | 60 min |
| phenol | | | 60 min |

L = liquid  G = gas

This application relates to subject matter disclosed in Federal Republic of Germany Application Number G 89 13 474 5, filed Nov. 15, 1989, the disclosure of which is incorporated herein by reference.

While the description above refers to particular embodiments of the present invention it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicted by the appended claims, rather than the foregoing description, and all changes which come within the meaning and range of equivalency of the claims are therefore intended to be embraced therein.

What is claimed is:

1. An article of protective clothing composed of a multi-layered material comprising the following sequence of layers from the outside to the inside:
   a first layer of a fluoroelastomer;
   a second layer of butyl rubber;
   a third layer of an aramid fiber cloth; and
   a fourth layer of butyl rubber.

2. An article of protective clothing in accordance with claim 1 wherein said material consists of said first, second, third and fourth layers.

3. An article of protective clothing in accordance with claim 2 wherein said third layer is a doublelayered, flexible aramid cloth having a weight per unit area of approximately 110 g/m$^2$.

4. An article of protective clothing in accordance with claim 3 wherein said first layer has a weight per unit area of 150 g/m$^2$, said second layer has a weight per unit area of 150 g/m$^2$, and said fourth layer has a weight per unit area of 150 g/m$^2$.

5. An article of protective clothing in accordance with claim 2 wherein said second and fourth layers of butyl rubber are vulcanized on said third layer of aramid fibers and said third layer is enclosed by said second and fourth layers.

6. An article of protective clothing in accordance with claim 2 composed of a plurality of panels of said multi-layered material and further comprising aramid fiber thread with which said panels are sewn together at seam regions.

7. An article of protective clothing in accordance with claim 6 further comprising at least one mass of fluoroelastomer covering and sealing together said first layers of two said panels at a seam region and at least one mass of butyl rubber covering and sealing together said fourth layers of two said panels at the seam region.

8. An article of protective clothing in accordance with claim 2 wherein said fluoroelastomer is fluorine rubber.

9. An article of protective clothing in accordance with claim 1 wherein said third layer is a double-layered, flexible aramid cloth having a weight per unit area of approximately 110 g/m$^2$.

10. An article of protective clothing in accordance with claim 9 wherein said first layer has a weight per unit area of 150 g/m$^2$, said second layer has a weight per unit area of 150 g/m$^2$, and said fourth layer has a weight per unit area of 150 g/m$^2$.

11. An article of protective clothing in accordance with claim 1 wherein said second and fourth layers of butyl rubber are vulcanized on said third layer of aramid fibers and said third layer is enclosed by said second and fourth layers.

12. An article of protective clothing in accordance with claim 1 composed of a plurality of panels of said multi-layered material and further comprising aramid fiber thread with which said panels are sewn together at seam regions.

13. An article of protective clothing in accordance with claim 12 further comprising at least one mass of fluorine rubber covering and sealing together said first layers of two said panels at a seam region and at least one mass of butyl rubber covering and sealing together said fourth layers of two said panels at the seam region.

14. An article of protective clothing in accordance with claim 1 wherein said fluoroelastomer is fluorine rubber.

* * * * *